United States Patent [19]
Vandenberg

[11] 3,883,449

[45] *May 13, 1975

[54] POLYMERIZATION OF 1,4-HALOSUBSTITUTED-2,3-EPOXYBUTANES

[75] Inventor: Edwin James Vandenberg, Wilmington, Del.

[73] Assignee: Hercules Incorporated, Wilmington, Del.

[ * ] Notice: The portion of the term of this patent subsequent to Nov. 19, 1991, has been disclaimed.

[22] Filed: Apr. 30, 1973

[21] Appl. No.: 355,395

Related U.S. Application Data

[63] Continuation-in-part of Ser. No. 322,585, Jan. 10, 1973.

[52] U.S. Cl. ......... 260/2 A; 252/431 R; 252/431 P; 260/615 BF
[51] Int. Cl. ............................................ C08g 23/14
[58] Field of Search ........... 260/2 A, 615 B, 615 BF

[56] References Cited
UNITED STATES PATENTS

| | | | |
|---|---|---|---|
| 2,856,370 | 10/1958 | Muetterties | 260/2 |
| 3,065,188 | 11/1962 | Vandenberg | 260/2 |
| 3,296,152 | 1/1967 | Achon | 260/2 |
| 3,379,655 | 4/1968 | Langley et al. | 260/2 |
| 3,503,898 | 3/1970 | Harris | 252/429 |

*Primary Examiner*—Melvin Goldstein
*Assistant Examiner*—E. A. Nielsen
*Attorney, Agent, or Firm*—Hazel L. Deming

[57] ABSTRACT

An improved process for the polymerization of 1,4-halosubstituted-2,3-epoxybutanes is described. Improvements in conversion, yield, and reaction rate are realized using as catalyst the combination of an aluminum trialkyl with boron trifluoride, phosphorus pentafluoride, phosphorus oxyfluoride or antimony pentafluoride and carrying out the polymerization of the epoxybutane(s) at below 0 °C.

10 Claims, No Drawings

POLYMERIZATION OF 1,4-HALOSUBSTITUTED-2,3-EPOXYBUTANES

This application is a continuation-in-part of my application Ser. No. 322,585 filed Jan. 10, 1973.

This invention relates to the polymerization of 1,4-halosubstituted-2,3-epoxybutanes, and more particularly to an improved process for preparing polymers of 1,4-dihalo-2,3-epoxybutanes.

It is well known that epoxides such as the alkylene oxides and halogen-substituted alkylene oxides, and oxetanes can be homo- or copolymerized using aluminum alkyl catalysts. The cis- and trans-1,4-dihalo-2,3-epoxybutanes can also be homopolymerized, or copolymerized with each other or with small amounts of other monomers containing oxirane or oxetane groups in this manner to give polymers ranging from low to high molecular weight polymers.

Further, it is known that high molecular weight polymers of vinyl alkyl ethers can be produced using as catalyst the combination of an aluminum alkyl compound with hydrogen fluoride (or a fluoride which is readily hydrolyzed to give hydrogen fluoride). Specific combinations illustrated as useful with vinyl alkyl ethers are premixtures of boron trifluoride etherate or hydrogen fluoride with aluminum triisopropoxide and premixtures of hydrogen fluoride and triisobutyl aluminum. Combinations of trialkyl aluminum and boron trifluoride etherate, however, are not effective catalysts for the polymerization of 1,4-halosubstituted-2,3-epoxybutanes.

Now, in accordance with this invention, it has been discovered that the rate of polymerization of 1,4-halosubstituted-2,3-epoxybutanes is improved and that high yields of polymer at high conversions are obtained using as the catalyst for the polymerization boron trifluoride, phosphorus pentafluoride, phosphorus oxyfluoride or antimony pentafluoride in combination with a trialkyl aluminum compound. This discovery was completely unexpected since the trialkyl aluminum catalysts alone and the Lewis acid catalysts such as boron trifluoride or phosphorus pentafluoride alone do not give polymers of 1,4-halosubstituted-2,3-epoxybutanes in high conversions and high yields in short periods of time at the same catalyst levels. Accordingly, the present invention relates to a process for producing polymers of 1,4-halosubstituted-2,3-epoxybutanes by contacting at least one 1,4-halosubstituted-2,3-epoxybutane under polymerization conditions at a temperature below about 0°C. with at least a catalytic amount of a catalyst combination comprising (a) an aluminum trialkyl or aluminum trialkyl which has been reacted with up to about 1.5 mole of water per mole of aluminum and preferably from about 0.1 to about 1.2 mole of water per mole of aluminum and (b) boron trifluoride, phosphorus pentafluoride, phosphorus oxyfluoride or antimony pentafluoride, components (a) and (b) being present in said combination in a molar ratio of from about 0.02:1 to about 5:1.

Any 1,4-halosubstituted-2,3-epoxybutane wherein the 1- and 4-halogen substituents are the same or different can be polymerized to give polyethers in accordance with this invention. Thus, both cis- and trans-1,4-halosubstituted-2,3-epoxybutanes can be homopolymerized or copolymerized with each other or with at least one different monomer copolymerizable with said epoxybutane by a cationic mechanism. The 1,4-halosubstituted-2,3-epoxybutanes have the general formula

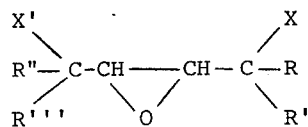

wherein X and X' are halogen, R and R'' are hydrogen or halogen and R' and R''' are hydrogen, halogen or an alkyl group. The X and X' substituents can be alike or different and are selected from chlorine, bromine, fluorine and iodine. Similarly, R, R', R'' or R''', when halogen, can be alike or different from each other or from X and X'. The alkyl groups which R' and R''' can comprise will preferably contain from one to seven carbon atoms and more preferably will be a straight chain alkyl group. Typical alkyl groups are methyl, ethyl, n-propyl, n-butyl, 4,4'-dimethyl pentyl and 3,4-dimethyl pentyl groups. Particularly preferred are the cis- and trans-1,4-dihalo-2,3-epoxybutanes wherein both halogens are the same. Typical 1,4-halosubstituted-2,3-epoxybutanes include, either in their cis- or trans-form, 1,4-dichloro-2,3-epoxybutane,
1,4-chlorofluoro-2,3-epoxybutane,
1,4-dibromo-2,3-epoxybutane,
1,4-chlorobromo-2,3-epoxybutane,
1,4-difluoro-2,3-epoxybutane,
1,4-bromofluoro-2,3-epoxybutane,
1,4-diiodo-2,3-epoxybutane,
1,1,4,4-tetrabromo-2,3-epoxybutane,
1,1,4,4-tetrafluoro-2,3-epoxybutane,
1,1,1,4,4,4-hexachloro-2,3-epoxybutane,
1,1,1,4,4,4-hexafluoro-2,3-epoxybutane,
1,1,1,4,4,4-hexabromo-2,3-epoxybutane,
1,1,1-trichloro-4,4,4-tribromo-2,3-epoxybutane,
1,1,1-chlorodibromo-4,4,4-chlorodibromo-2,3-epoxybutane,
2,5-dichloro-3,4-epoxyhexane,
2,5-dibromo-3,4-epoxyhexane,
2,5-difluoro-3,4-epoxyhexane,
2-chloro-5-fluoro-3,4-époxyhexane,
2-chloro-5-bromo-3,4-epoxyhexane,
1,4-dichloro-2,3-epoxypentane,
1,4 -difluoro-2,3-epoxypentane,
1,4-dibromo-2,3-epoxypentane,
1-chloro-4-fluoro-2,3-epoxypentane,
1-chloro-4-bromo-2,3-epoxypentane,
5,8-dichloro-6,7-epoxydodecane,
8,11-dichloro-9,10-epoxyoctadecane,
and the like.

Other monomers which can be copolymerized with the 1,4-halosubstituted-2,3-epoxybutanes to give copolymers are in general any monomer which is copolymerizable with the epoxybutane and is polymerizable by a cationic mechanism. Preferred comonomers are the cyclic oxides containing from three to five members in the ring such as the epoxides (i.e., oxiranes), oxetanes and furans.

Exemplary of epoxide comonomers are the alkylene oxides such as
ethylene oxide,
propylene oxide,
1-butene oxide,
cis-2-butene oxide,
trans-2-butene oxide, isobutylene oxide,
1-hexene oxide,
and the like,
the cycloaliphatic oxides such as
 cyclohexene oxide,
 vinyl cyclohexene oxide,
 α-pinene epoxide,
 cyclooctene oxide,
 dipentene epoxide,
 and the like,
arylalkylene oxides such as
 styrene oxide,
 and the like,
alkenylalkylene oxides such as
 butadiene monoxide
 and the like,
epoxy ethers such as alkyl glycidyl ethers, as for example,
 methyl gylcidyl ether,
 ethyl glycidyl ether,
 isopropyl glycidyl ether,
 t-butyl glycidyl ether,
 n-hexyl glycidyl ether,
 n-octyl glycidyl ether,
 and the like,
aryl glycidyl ethers, such as
 phenyl glycidyl ether,
 naphthyl glycidyl ether,
 and the like,
unsaturated glycidyl ethers such as the alkenyl glycidyl ethers as for example,
 vinyl glycidyl ether,
 allyl glycidyl ether,
 and the like,
the alkenyl aryl glycidyl ethers such as
 o-allylphenyl glycidyl ether,
 p-crotylphenyl glycidyl ether,
 and the like,
the acetylenically unsaturated epoxides such as the epoxy alkynes containing five to 18 carbon atoms and particularly
 1,2-epoxy-4-decyne,
 1,2-epoxy-4-hexyne,
 cis- and trans-5,6-epoxy-8-decyne,
 cis- and trans-5,6-epoxy-2,8-decadiyne,
 and the like,
the heterocyclic epoxides such as
 5,6-epoxy-1,3-dioxepane
 2-methyl-5,6-epoxy-1,3-dioxepane,
 2-butyl-5,6-epoxy-1,3-dioxepane,
 2,2-dimethyl-5,6-epoxy-1,3-dioxepane,
 3,4-epoxy-tetrahydropyran,
 and the like,
glycidyl esters such as
 glycidyl acetate,
 glycidyl propionate,
 glycidyl pivalate,
 glycidyl methacrylate,
 glycidyl acrylate,
 and the like,
alkyl glycidates such as
 methyl glycidate,
 ethyl glycidate,
 and the like,
haloalkylene oxides such as
 epifluorohydrin,
 epichlorohydrin,
 epibromohydrin,
 epiiodohydrin,
 2-methyl-3-chloro-1,2-epoxypropane,
 2-methyl-3-bromo-1,2-epoxybutane,
 1,2-dichloro-3,4-epoxybutane,
 1,2-dibromo-3,4-epoxybutane,
 1,2-difluoro-2,3-epoxybutane,
 1-chloro-3,4-epoxybutane,
 1-chloro-4,5-epoxypentane,
 1-bromo-3,4-epoxybutane,
 1-fluoro-3,4-epoxybutane,
 1-bromo-4,5-epoxybutane,
 1,1-dichloro-2,3-epoxypropane,
 1,1,1-trichloro-2,3-epoxypropane,
 1,1,1-trichloro-3,4-epoxybutane,
 1,1,1-trifluoro-2,3-epoxypropane,
 1,1,1-trifluoro-3,4-epoxybutane,
 1,1,1-tribromo-3,4-epoxybutane,
 and the like,
haloalkyl glycidyl ethers such as
 2,2-bis(chloromethyl)ethyl glycidyl ether,
 2-chloroethyl glycidyl ether,
 2-bromoethyl glycidyl ether,
 2-chloro-1-methylethyl glycidyl ether,
 2,2,2-tris(chloromethyl)ethyl glycidyl ether,
 and the like,
haloaryl glycidyl ethers such as
 p-chlorophenyl glycidyl ether,
 o-chlorophenyl glycidyl ether,
 and the like,
haloalkylaryl glycidyl ethers such as
 chloromethylphenyl glycidyl ether,
 chloromethylnaphthyl glycidyl ether,
 and the like.
Exemplary of the oxetanes are
 oxetane (also known as trimethylene oxide),
 2-methyl oxetane,
 2-ethyl oxetane,
 2-butyl oxetane,
 2-octyl oxetane,
 2-cyclohexyl oxetane,
 2-methoxy oxetane,
 2-ethoxy oxetane,
 2-propoxy oxetane,
 2-hexoxy oxetane,
 2-methoxymethyl oxetane,
 2-butoxymethyl oxetane,
 2-benzyl oxetane,
 2-phenoxy oxetane,
 2-benzyloxymethyl oxetane,
 2-allyl oxetane,
 2-vinylbenzene oxetane,
 2,2-dimethyl oxetane,
 2-methoxy-2-methyl oxetane,
 2-methallyl-2-methyl oxetane,
 2-methyl-3-methyl oxetane,
 3-methyl oxetane,
 3-butyl oxetane,
 3-octyl oxetane,
 3-cyclohexyl oxetane,
 3-phenyl oxetane,
 3-allyl oxetane,
 3-methoxy oxetane,
 3-hexoxy oxetane,
 3-methoxymethyl oxetane,
 3-decoxymethyl oxetane,
 3,3-dimethyl oxetane, 3,3-diisopropyl oxetane,
3,3-dioctyl oxetane,
3-methoxy-3-methyl oxetane,
3-ethoxymethyl-3-methyl oxetane,
3,3-bis(phenoxymethyl) oxetane,
3-vinyl-3-methyl oxetane,
3,3-bis(allyl) oxetane,
2-methyl-3-methyl-4-methyl oxetane,
2-methyl-4-methyl oxetane,
and the like,
haloalkyl and haloalkoxy oxetanes such as
2-chloromethyl oxetane,
2-β-bromoethyl oxetane,
2-fluoromethyl oxetane,
2-trifluoromethyl oxetane,
2-γ-iodopropyl oxetane,
2-β-chlorobutyl oxetane,
2-fluoromethoxy oxetane,
2-chloromethoxy oxetane,
2-bromomethoxy oxetane,
2-iodomethoxy oxetane,
2-β-chloroethoxy oxetane,
2-β-bromobutoxy oxetane,
2-β-fluorooctoxy oxetane,
2-fluoromethoxy methyl oxetane,
2-β-chloroethoxy methoxy oxetane,
2-γ-bromoisopropoxy methyl oxetane,
2-γ-iodobutoxy methyl oxetane,
2-γ-fluorohexoxy methyl oxetane,
2-ω-chlorodecoxy methyl oxetane,
3-chloromethyl oxetane,
3-β-bromoethyl oxetane,
3-β-iodomethyl oxetane,
3-trifluoromethyl oxetane,
3-β-iodopropyl oxetane,
3-β-chlorobutyl oxetane,
3,3-bis(chloromethyl) oxetane,
3,3-bis(fluoromethyl) oxetane,
3,3-bis(iodomethyl) oxetane,
3,3-bis(bromomethyl) oxetane,
3-fluoromethoxy oxetane,
3-chloromethoxy oxetane,
3-bromomethoxy oxetane,
3-iodomethoxy oxetane,
3-β-chloroethoxy oxetane,
3-ω-bromobutoxy oxetane,
3-β-fluorooctoxy oxetane,
3-fluoromethoxy methyl oxetane,
3-β-chloroethoxy methyl oxetane,
3-β-bromoisopropoxy methyl oxetane,
3-ω-iodobutoxy oxetane,
3-ω-fluorohexoxy methyl oxetane,
3-ω-chlorodecoxy methyl oxetane,
and the like.
Exemplary of the furans are the tetrahydrofurans such as
tetrahydrofuran,
2-methyltetrahydrofuran,
2,3,4-trimethyltetrahydrofuran,
and the like,
halo-tetrahydrofuranes such as
3-(β-chloroethyl)-tetrahydrofuran,
2-trifluoromethyltetrahydrofuran,
2,3,4-tris(trifluoromethyl)-tetrahydrofuran,
and the like.

The polymers produced in accordance with the invention are polyethers and usually contain, by weight, from 100% to about 20% of a 1,4-halosubstituted-2,3-epoxybutane and from 0 to about 80%, preferably 0 to about 50%, of at least one different cyclic oxide comonomer. When the polymer is a copolymer of 1,4-dihalo-2,3-epoxybutane, the comonomer content will preferably range from 0 to about 70% and more preferably from 0 to about 30%. The homopolymers are usually characterized by being hard, tough, high melting, at least partially crystalline solids, hard, tough amorphous solids or rubbery amorphous solids. The copolymers are of the random or block type and are also characterized by being hard, tough, at least partially crystalline solids, hard, tough, amorphous solids or rubbery amorphous solids. Copolymers of the crystalline type usually have lower melting points than the homopolymers. The crystalline copolymers of the symmetrical cis-1,4-dihalo-2,3-epoxybutanes containing up to about 10% of comonomer usually have melting points of at least about 150°C. and preferably at least about 180°C. The crystalline copolymers of the symmetrical trans-1,4-dihalo-2,3-epoxybutanes containing up to about 10% of comonomer usually have melting points of at least about 80°C. and preferably at least about 100°C.

The polymers produced in accordacne with the invention are still further characterized by being generally insoluble in water and aliphatic hydrocarbons, but generally soluble in cyclohexanone and dimethyl formamide at or above about 50°C. The crystalline polymers are also generally insoluble in aromatic hydrocarbons and chlorinated solvents whereas the amorphous polymers are generally soluble in aromatic hydrocarbon and chlorinated solvents. The preferred crystalline and amorphous polymers are substantially linear polyethers having a Reduced Specific Viscosity (RSV) of at least about 0.1, preferably at least about 0.2 and more preferably at least about 0.4 when measured as a 0.1% or a 0.2% solution in dimethyl formamide at 50°C.

The polymerization can be carried out with or without a diluent, but for ease of operation, separation of the catalyst from the polymer, etc., is generally carried out in an inert liquid diluent which is usually a nonsolvent for the polymer, is at least a partial solvent for the epoxybutane and comprises a partially halogenated aliphatic or cycloaliphatic hydrocarbon. Preferably, the diluent will have a freezing point lower than about −30°C. and most preferably lower than about −50°C. Exemplary of suitable diluents are methylene chloride, methylene bromide, ethyl chloride, butyl chloride, 1,1-dichloroethane, 1,1-dibromoethane, 1,1-dichloropropane, 1,1-dichlorobutane, trifluoromethane, dichlorofluoromethane, chlorodifluoromethane, 1,1-difluoroethane, 1,1-difluoro-1-chloroethane, trichloroethylene, chlorocyclohexane, bromocyclohexane, etc., or combinations of such partially halogenated hydrocarbons with each other or with up to about 75% and preferably up to about 50% of nonhalogenated hydrocarbon diluents such as methane, ethane, propane, butane, hexane, n-heptane, cyclopentane, cyclohexane, methyl cyclohexane, ethylene, propylene, butene-1, cyclopentene, cyclohexene, etc.; with fully halogenated, aliphatic or cycloaliphatic hydrocarbons such as carbon tetrachloride, carbon tetrafluoride, chlorotrifluoromethane, dichlorodifluoromethane, fluorotrichloromethane, perchloroethylene, perfluoroethylene, perfluoropropylene, perchloroethane, 1,1,1-trichloro-2,2,2-trifluoroethane, 1,1,2,2-tetrachloro-1,2-difluoroethane, 1,1,2,2-tetrafluoro-1,2-dichloroethane, etc.; or with halogenated aromatic hydrocarbons such as chlorobenzene, difluorobenzene, dichlorobenzene, etc. However, the ethers, nitroalkanes, nitroaromatic, sulfur dioxide and similar diluents which have sometimes been used with Lewis acid type catalysts are not suitable diluents for the process of this invention. The diluents, as well as the monomer(s) and polymerization equipment in general, should be relatively free of impurities which are deleterious to the polymerization such as water, alcohols, esters, ketones and the like, and it is usually advantageous to free the diluents and monomer(s) from water by pretreatment as, for example, using molecular sieves. The amount of diluent employed is, of course, largely a matter of choice but, if used, should be sufficient to provide ease of agitation and usually will provide a final polymer solids content of from about 5 to about 30%.

The catalyst used in the process of the invention is, as stated, a combination of an aluminum trialkyl or an aluminum trialkyl which has been modified by reaction with up to about 1.5 mole of water per mole of aluminum and boron trifluoride, phosphorus pentafluoride, phosphorus oxyfluoride or antimony pentafluoride. The aluminum trialkyls and the water modified aluminum trialkyl compounds are described in U.S. Pat. Nos. 3,065,188 and 3,135,705. The boron trifluoride ($BF_3$), phosphorus pentafluoride ($PF_5$), and phosphorus oxyfluoride ($POF_3$) components of the catalyst combination are gaseous compounds and the antimony pentafluoride ($SbF_5$) is a liquid compound. These compounds have not been modified in any manner prior to combination with the aluminum trialkyl. If desired, the catalyst components can be premixed or prereacted prior to addition to the polymerization mixture. This can be done in the presence or absence of an inert diluent or mixtures of diluents by mixing the individual components at temperatures below about 0°C. and preferably at below about −50°C. Excellent results are also obtained by combining the aluminum trialkyl with the boron trifluoride, phosphorus pentafluoride, phosphorus oxyfluoride or antimony pentafluoride in situ. This can be accomplished by adding the specified amount of aluminum trialkyl to the epoxybutane-diluent mixture being polymerized and then adding the boron trifluoride, phosphorus pentafluoride, phosphorus oxyfluoride or antimony pentafluoride, or the two can be added to the polymerization reaction mixture simultaneously. The preferred aluminum trialkyls are compounds wherein the alkyl groups contain one to 20 and more preferably one to eight carbon atoms. Preferred alkyl groups are methyl, ethyl, isopropyl, butyl, isobutyl, hexyl and octyl. The molar ratio of the aluminum trialkyl compound to boron trifluoride, phosphorus pentafluoride, phosphorus oxyfluoride or antimony pentafluoride can be varied over a relatively wide range depending on polymerization temperature, type and purity of diluent, monomer(s), monomer concentration, type and molecular weight of polymer, etc. Usually the molar ratio will range from about 0.02:1 to about 5:1, preferably from about 0.05:1 to about 2:1 and more preferably from about 0.1:1 to about 1.5:1 if all of the advantages of the invention are to be realized. The amount of the catalyst combination used will depend on the monomer(s) being polymerized, the polymerization conditions being used, etc., but will generally vary from a small catalytic amount up to a large excess, and usually will be within the range of from about 0.1 to about 10 mole % based on the monomer. The catalyst combination can be added all at once, portionwise, or continously throughout the polymerization or the individual components of the catalyst combination can be added in the same manner or in a different manner from each other. For example, one component can be added all at once and the other component portionwise or continuously throughout the polymerization.

The polymerization reaction, as stated, is carried out at a temperature below 0°C. In general the temperature will range from about −150°C. to −30°C. and preferably will range from about −100°C. to −30°C. Usually, agitation will be used to achieve proper mixing.

The molecular weight of the polymer product can be varied from low to high depending on such factors as the selection of monomer and diluent, catalyst composition, monomer concentration and reaction conditions. Certain diluent components and particularly the monohaloalkanes such as ethyl chloride and isopropyl chloride are effective chain transfer agents and when present in varying amounts as part of the diluent system also provide control of the molecular weight. The polymer can be recovered by any of the usual means. In the case of dispersions, the polymer can be recovered by filtration, centrifugation, or any other desired means. In the case of solutions, the polymer can be recovered by steam coagulation followed by filtration, etc., or by evaporation of the diluent. Purification of the polymer to remove catalyst residues can be carried out conventionally and usually will be accomplished by washing with acidified water or acidified water containing a metal complexing agent. Moreover, since smaller amounts of catalyst are used than heretofore and the Lewis acid component, especially boron trifluoride and phosphorus pentafluoride, are readily hydrolyzed in water, purification is simplified and catalyst free products can be obtained when required.

The polymers produced in accordance with this invention find use in a wide variety of applications such as wax, coating and plastic applications. The solid polymers are particularly useful in solvent and powder coatings for metal and other substrates, as films, fibers, molded articles or foams, as impregnates for paper, textile fabrics, etc., as binders for nonwovens, as adhesives, etc. The polymers can also be compounded with stabilizers, fillers or other additives such as crosslinking agents, gas-releasing agents, etc.

The following examples illustrate the preparation of the solid polymers of this invention. All parts and percentages are by weight unless otherwise indicated. The molecular weight of the polymers is shown by their Reduced Specific Viscosity (RSV). By the term "Reduced Specific Viscosity" is meant the $vsp/c$ determined on a 0.1% or 0.2% solution of the polymer in a solvent, usually dimethyl formamide at 50°C., essentially equivalent results being obtained at either dilution. The melting point of the polymer is determined by differential thermal analysis (DTA) or by differential scanning calorimetry (DSC) and is the temperature at which the last crystallinity disappears.

EXAMPLE 1

A one liter creased flask equipped with a Teflon anchor type stirrer was placed in a cooling bath and air was removed from the flask and replaced with nitrogen. The flask was charged with 561 parts of dry methylene chloride and 122.4 parts of n-heptane and agitation was started. The temperature of the charge was reduced using dry ice in the bath and when the temperature reached −79°C., 2.32 parts of a 4.4M solution of a triisobutylaluminum-water catalyst (equivalent to 12.0 millimoles of aluminum) was added with stirring, following which 0.41 part (6 millimoles) of boron trifluoride was added over 3 minutes. The triisobutylaluminum-water catalyst used in this example was a 4.4M solution of triisobutylaluminum which had been reacted with 0.67 mole of water per mole of aluminum. This catalyst was prepared by diluting commercial triisobutylaluminum with n-heptane to a 0.5M concentration, adding 0.67 mole of water per mole of aluminum dropwise with agitation over a period of 3.5 hours at 0°C., permitting the temperature to rise over 4 hours to 25°C., letting the mixture stand at 25°C. for at least 24 hours and then vacuum distilling off sufficient heptane at 50°C. to give a catalyst concentration of 4.4M with respect to aluminum. The charge was stirred for 9 minutes and then a total of 100.4 parts of trans-1,4-dichloro2,3-epoxybutane was added dropwise over a period of 2 hours, the rate of addition being 1.0 to 1.3 parts/minute for the first hour and 0.4 to 0.5 part/minute for the second hour. Agitation was continued and the temperature was maintained at −78°C. for an additional 5.5 hours (total reaction time of 7.5 hours). Additional triisobutylaluminum-water catalyst (prepared by diluting the triisobutylaluminum-water reaction product to a 1 molar solution with n-heptane) was added dropwise in the amount of 4.4 parts after 3.5 hours and 2.2 parts after 5.5 hours of total reaction time, and the temperature of the reaction mixture was gradually increased to −72°C. Agitation was continued at −72°C. for an additional 2 hours, after which time the polymerization reaction was terminated by adding 17 parts of 2N aqueous hydrogen chloride with agitation. The cooling bath was removed and the mixture was agitated continuously until the temperature reached room temperature. The polymer mixture was next washed three times by stirring with 400 parts of 10% aqueous hydrogen chloride for 2 hours and removing the water layer, and then finally washed with water until neutral. The polymer was isolated by adding an equal volume of methanol, collecting the polymer by filtration, washing with methanol until substantially free of methylene chloride and unreacted monomer, washing once with a solution of 0.2% of 4,4'-thiobis(3-methyl-6-tert.-butyl phenol) in methanol, and then drying. The isolated product (recovered in 79% conversion) was solid, particulate crystalline poly(trans-1,4-dichloro-2,3-epoxybutane) having an RSV of 0.43.

EXAMPLE 2

A 500 ml. flask equipped with an agitator having a half moon Teflon blade was placed in a cooling bath and air was removed from the flask and replaced with nitrogen. The flask was charged with 327 parts of methylene chloride, 71.3 parts of n-heptane and 70.0 parts of trans-1,4-dichloro-2,3-epoxybutane. Agitation was started and the temperature of the charge was reduced using dry ice in the bath. When the temperature reached −62.5°C. (crystallization of the trans-1,4-dichloro-2,3-epoxybutane occurred at −60°C.), 1.63 parts of the 4.4M solution of triisobutylaluminum-water catalyst of Example 1 (equivalent to 8.5 millimoles of aluminum) was added with agitation, following which 10 increments of 0.028 part (0.42 millimole) of boron trifluoride were added at 0, 5, 15, 45, 75, 78, 84, 90, 96 and 102 minutes of reaction time, the temperature being maintained at −61°C. to −62°C. At 2.1 hours of reaction time, an additional portion of 0.77 parts of triisobutylaluminum-water catalyst was added, and agitation was continued, the reaction temperature being maintained at −55°C. to −60°C. After a total of 5.5 hours of reaction time, the polymerization reaction was terminated by adding 10 parts of 2N aqueous hydrogen chloride in ethanol, following which the cooling bath was removed and the temperature of the mixture was permitted to rise to room temperature with agitation. The mixture was next washed three times by stirring with 240 parts of 10% aqueous hydrogen chloride, washed neutral with water and then isolated according to the procedure of Example 1. The isolated product (recovered in 79% conversion) was 65.7 parts of solids, particulate crystalline poly(trans-1,4-dichloro-2,3-epoxybutane) having an RSV of 0.38 and a melting point of 140°C. By DSC it was found to have a heat of fusion of 7.4 calories/gram.

EXAMPLE 3

The general procedure of Example 1 was repeated except that: the initial charge was 552 parts of dry methylene chloride, 120.2 parts of n-heptane and 9.0 parts of dry ethyl chloride; 84.6 parts of cis-1,4-dichloro-2,3-epoxybutane was substituted for the 100.4 parts of trans-1,4-dichloro-2,3-epoxybutane; the epoxybutane was added dropwise with stirring at a rate of 1.3 parts/min. for the first 30 minutes, then at a rate of 0.8 part/min. for the next 15 minutes and finally at a rate of 0.4 part/min. for 84 minutes; the temperature of the reaction was maintained at −73°C. to −77°C.; the total reaction time was 4.25 hours; and no additional catalyst was added. The isolated product (recovered in 92% conversion) was 76.3 parts of solid, particulate crystalline poly(cis-1,4-dichloro-2,3-epoxybutane) having an RSV of 0.73.

EXAMPLE 4

A polymerization reaction vessel was charged under nitrogen with 128 parts of dry methylene chloride and 10 parts of cis-1,4-dichloro-2,3-epoxybutane. The vessel was placed in a bath of dry ice and when the temperature of the charge reached −78°C., 0.19 part (equivalent to 1.0 millimole of aluminum) of the triisobutylaluminum-water catalyst of Example 1 and 0.068 part (1.0 millimole) of boron trifluoride gas (at room temperature) were added. The vessel was shaken and then returned to the bath. The reaction mixture solidified in 15 minutes. After 19 hours in the bath the polymerization reaction was terminated by adding 4 parts of anhydrous ethanol. The cooling bath was removed and the mixture permitted to warm up to room temperature. The polymer mixture was diluted with methylene chloride and then washed twice by stirring for 2 hours with 100 parts of 10% aqueous hydrogen chloride, and then finally washed with water until neutral. The methylene chloride-insoluble polymer was collected by filtration, washed twice with methylene chloride and then once with a solution of 0.2% of 4,4'-thiobis-(3-methyl-6-tert. butyl phenol) in anhydrous ethanol and dried for 16 hours under vacuum at 80°C. The isolated product (recovered in 99% conversion) was solid crystalline poly(cis-1,4-dichloro-2,3-epoxybutane) having an RSV of 1.10, and a melting point of 233°C. By DSC it was found to have a heat of fusion of 8.7 calories/gram.

The methylene chloride-soluble polymer was recovered by adding 0.05 part of a 1% solution of 4,4'-thiobis-(3-methyl-6-tert. butyl phenol) in anhydrous ethanol to the methylene chloride filtrate and washings, stripping off the methylene chloride and then drying the residue for 16 hours under vacuum at 80°C. A solid product was recovered in 1% conversion.

When the procedure of this example was repeated with the exception that no boron trifluoride was used, solidification occurred after 2 hours. The methylene chloride-insoluble fraction was solid crystalline polymer (recovered in 29% conversion) having an RSV of 1.02; the methylene chloride-soluble fraction was solid crystalline polymer (recovered in 6% conversion) having an RSV of 0.69.

EXAMPLE 5

The procedure of Example 4 was repeated except that 0.095 part of the triisobutylaluminum catalyst and 0.034 part of boron trifluoride were added initially followed by the addition of an equal amount of each after 1 hour of polymerization time and the total polymerization time was 22 hours. Solidification occurred after 1.25 hours. The methylene chloride-insoluble fraction (recovered in 97.5% conversion) was solid crystalline poly(cis-1,4-dichloro-2,3-epoxybutane) having an RSV of 1.30, a melting point of 230°C. and a heat of fusion (DSC) of 8.1 calories/gram. The methylene chloride-soluble fraction (recovered in 1.7% conversion) was solid crystalline polymer.

When the procedure of this example was repeated using as the sole catalyst either the triisobutylaluminum-water (control A) or the boron trifluoride (control B), solidification did not occur. The methylene chloride-insoluble polymer of control A was obtained in 41% conversion and had an RSV of 1.94. The methylene chloride-insoluble polymer of control B was obtained in 36% coversion and had an RSV of 0.22. Methylene chloride-soluble polymer was obtained in conversions of 0.2% (control A) and 11% (control B).

EXAMPLE 6

The procedure of Example 4 was repeated except that the amount of boron trifluoride used was 0.034 part (0.5 millimole) and the total polymerization time was increased to 22 hours. Solidification occurred after 1.5 hours of polymerization time. The methylene chloride-insoluble fraction (recovered in 97.9% conversion) was solid crystalline poly(cis-1,4-dichloro-2,3-epoxybutane) having an RSV of 1.60, a melting point of 233°C. and a heat of fusion (DSC) of 8.7 calories/gram. The methylene chloride-soluble fraction (recovered in 1.2% conversion) was solid crystalline poly(cis-1,4-dichloro-2,3-epoxybutane).

EXAMPLE 7

The general procedure of Example 4 was repeated except that 0.48 part (equivalent to 1 millimole of aluminum) of a 1.5M solution of triethylaluminum was substituted for the triisobutylaluminum-water catalyst of Example 4. The triethylaluminum used in this example was a 1.5 molar solution of triethylaluminum in n-heptane prepared by diluting commercial triethylaluminum with n-heptane to a 1.5M concentration under nitrogen. Solidification occurred after 1 hour of polymerization time. The methylene chloride-insoluble polymer (recovered in 90% conversion) was solid crystalline poly(cis-1,4-dichloro-2,3-epoxybutane) having an RSV of 1.64, a melting point of 232°C. and a heat of fusion (DSC) of 8.7 calories/gram. The methylene chloride-soluble fraction (obtained in 4.4% conversion) was solid crystalline poly(cis-1,4-dichloro-2,3-epoxybutane).

When this example was repeated with the exceptions that no boron trifluoride was used and three additional portions of 0.48 part of the triethylaluminum solution were added after 1, 2 and 3 hours of polymerization time, solidification did not occur and the methylene chloride-insoluble polymer (obtained in 63% conversion) had an RSV of 1.0.

EXAMPLE 8

The procedure of Example 4 was repeated except that 10 parts of trans-1,4-dichloro-2,3-epoxybutane was substituted for the 10 parts of cis-1,4-dichloro-2,3-epoxybutane, 2.9 parts (equivalent to 2 millimoles of aluminum) of a 0.5M n-heptane solution of triisobutylaluminum which had been reacted with 0.67 mole of water per mole of aluminum was substituted for the 0.19 part of the triisobutylaluminum-water catalyst of Example 4, and 0.126 part (1.0 millimole) of phosphorus pentafluoride was sbustituted for the 0.068 part of boron trifluoride. Solidification occurred and the reaction was terminated after 3 hours. The methylene chloride-insoluble fraction (recovered in 54% conversion) was 5.4 parts of crystalline poly(trans-1,4-dichloro-2,3-epoxybutane) having an RSV of 0.54 (determined on a 0.1% solution of the polymer in tetrahydrofuran at 25°C.). The methylene chloride-soluble fraction (recovered in 4.7% conversion) was a brittle film.

When this EXample was repeated with the exception that no triisobutylaluminum-water was present, the methylene chloride-insoluble fraction (obtained in 39% conversion) was a solid polymer having an RSV in tetrahydrofuran of 0.22 and the methylene chloride-soluble fraction was obtained in 8.5% conversion.

EXAMPLE 9

The polymerization procedure of Example 4 was repeated except that 0.22 part (1.0 millimole) of antimony pentafluoride was substituted for the 0.068 part of boron trifluoride, and the polymerization was terminated after 21 hours. In this example, the polymer was recovered by adding an equal volume of methanol to the polymer mixture at room temperature, collecting the precipitated polymer by filtration, washing the polymer twice with methanol and then once with a solution of 0.2% of 4,4'-thiobis-(3-methyl-6-tert. butyl phenol) in anhydrous methanol and then drying for 16 hours at 80°C. under vacuum. The isolated product (recovered in 82% conversion) was 8.2 parts of solid crystalline poly(cis-1,4-dichloro-2,3-epoxybutane) having an RSV of 0.30, a melting point of 217°C. and a heat of fusion (DSC) of 6.4 calories/gram.

EXAMPLE 10

A polymerization vessel was charged under nitrogen with 16.0 parts of dry methylene chloride and 2.82 parts of trans-1,4-difluoro-2,3-epoxybutane. The vessel was placed in a bath of dry ice and when the temperature of the charge reached −78°C., 0.36 part (equivalent to 0.5 millimole of aluminum) of a 1M n-heptane solution of triisobutylaluminum which had been reacted with 0.67 mole of water per mole of aluminum was added. The vessel was shaken and the temperature of the charge was reduced to −78°C. and additional, equal amounts of the triisobutylaluminum-water catalyst were added with shaking after 1 and 2 hours of reacton time. After 6 hours very little, if any, polymer was evident and 0.052 (0.76 millimole) of boron trifluoride was added. Immediately the charge became a viscous gel which solidified at a total polymerization time of 6.5 hours. After 24 hours the polymerization reaction was terminated by adding 1.4 parts of anhydrous ethanol. The cooling bath was removed and the mixture permitted to warm up to room temperature. The polymer mixture was diluted with methylene chloride and then washed twice by stirring for 2 hours with 100 parts of 10% aqueous hydrogen chloride, and then finally washed with water until neutral. The methylene chloride-insoluble polymer was collected by filtration, washed twice with methylene chloride and then once with a 0.5% solution of Irganox 1010 (pentaerythritol tetraester of 3(3,5-di-tert.butyl-4-hydroxyphenyl)propionic acid) in acetone and a 2.0% solution of ERL 2774 (diglycidyl ether of bisphenol A) in benzene and dried for 16 hours under vacuum at 80°C. The isolated product (recovered in 61% conversion) was 1.76 parts of a white powdery poly(trans-1,4-difluoro-2,3-epoxybutane) having an RSV of 0.33 and a melting point of 140°C. The product was crystalline by x-ray and DSC and had a heat of fusion (DSC) of 12.2 calories/gram.

The methylene chloride-solid fraction was recovered according to the procedure of Example 4 and was a hard to waxy solid (5.3% conversion) having an RSV of 0.03.

EXAMPLE 11

The procedure of Example 4 was repeated except that the initial charge was 16.0 parts of methylene chloride and 2.5 parts of trans-1,4-chlorofluoro-2,3-epoxybutane, 0.72 part (equivalent to 1 millimole of aluminum) of a 1M n-heptane solution of triisobutylaluminum which had been reacted with 0.67 mole of water and 0.017 part (0.25 millimole) of boron trifluoride were used, solidification occurred at 2 hours and the reaction was terminated after 21 hours with 1.3 parts of anhydrous ethanol. The methylene chloride-insoluble fraction (32.8% conversion) was a hard brittle solid of poly(trans-1,4-chlorofluoro-2,3-epoxybutane) having an RSV of 0.72, a melting point of 122°C. and a heat of fusion (DSC) of 7.3 calories/gram. The methylene chloride-soluble fraction (45% conversion) was a hard brittle solid polymer having an RSV of 0.43, a melting point of 122°C. and a heat of fusion of 3.9.

EXAMPLE 12

The procedure of Example 10 was repeated except that 32.8 parts of methylene chloride was used, 2.73 parts of cis-1,4-chlorofluoro-2,3-epoxybutane was substituted for the 2.82 parts of trans-1,4-difluoro-2,3-epoxybutane, the additional amounts of triisobutylaluminum-water catalyst was added after 2 and 3 hours of reaction time instead of 1 and 2 hours, the boron trifluoride was added after 19 hours, at which time no polymer was observed, and the polymerization reaction was terminated when the mixture became slightly viscous at 24 hours of total reaction time. No methylene chloride-insoluble polymer was observed.

The methylene chloride-soluble polymer was recovered by adding 0.1 part of a 10% solution of Irganox 1010 in acetone and 0.2 part of a 20% solution of ERL 2774 in benzene to the methylene chloride filtrate, stripping off the methylene chloride and then drying the residue for 16 hours under vacuum at 80°C. A hard, adherent film of poly(cis-1,4-chlorofluoro-2,3-epoxybutane) having an RSV of 0.21 was obtained in 86% conversion. DSC data indicated that the polymer was completely amorphous.

EXAMPLE 13

The procedure of Example 10 was repeated except that a mixture of 1.76 parts of trans-1,4-difluoro-2,3-epoxybutane and 0.78 part of cis-1,4-difluoro-2,3-epoxybutane was substituted for the 2.82 parts of trans-1,4-difluoro-2,3-epoxybutane, 1.08 parts (equivalent to 1.5 millimoles of aluminum) of the 1M triisobutylaluminum-water catalyst and 0.052 part (0.76 millimoles) of boron trifluoride were added initially; only one additional equal amount of boron trifluoride was added, at 3 hours of reaction time, and the total polymerization time was 19 hours, the final mixture being a solid mass. The methylene chloride-insoluble fraction (recovered in 1.3% conversion) was 0.034 part of a white solid having a melting point of 152°C. and a heat of fusion (DSC) of 11.1 calories/gram. The methylene chloride-soluble fraction (recovered in 95% conversion) was 2.41 parts of a tacky cloudy rubbery copolymer of cis- and trans-1,4-difluoro-2,3-epoxybutane having an RSV of 0.09, a melting point of 110°C. and a heat of fusion (DSC) of 4.6 calories/gram.

What I claim and desire to protect by Letters Patent is:

1. A process for producing polymers of 1,4-halosubstituted-2,3-epoxybutanes comprising contacting at least one 1,4-halosubstituted-2,3-epoxybutane under polymerization conditions at a temperature below 0°C. with at least a catalytic amount of a catalyst combination consisting essentially of
   a. an aluminum trialkyl or an aluminum trialkyl which has been reacted with up to about 1.5 mole of water per mole of aluminum, and
   b. boron trifluoride, phosphorus pentafluoride, phosphorus oxyfluoride or antimony pentafluoride, components (a) and (b) being present in said combination in a molar ratio of from about 0.02:1 to about 5:1.

2. The process of claim 1 wherein said epoxybutane is a 1,4-dihalo-2,3-epoxybutane.

3. The process of claim 2 wherein said epoxybutane is cis-1,4-dichloro-2,3-epoxybutane.

4. The process of claim 2 wherein said epoxybutane is trans-1,4-dichloro-2,3-epoxybutane.

5. The process of claim 2 wherein said epoxybutane is a mixture of cis- and trans-1,4-dihalo-2,3-epoxybutanes.

6. The process of claim 2 wherein the polymerization is carried out in the presence of a partially halogentated aliphatic or cycloaliphatic hydrocarbon diluent.

7. The process of claim 6 wherein the diluent is methylene chloride.

8. The process of claim 7 wherein the catalyst combination consists essentially of triisobutylaluminum which has been reacted with 0.67 mole of water per mole of aluminum and boron trifluoride.

9. The process of claim 7 wherein the catalyst combination consists essentially of triethylaluminum and boron trifluoride.

10. The process of claim 7 wherein the catalyst combination consists essentially of triisobutylaluminum which has been reacted with 0.67 mole of water per mole of aluminum and phosphorus pentafluoride.

* * * * *